United States Patent [19]

Hobbs et al.

[11] Patent Number: 4,505,344

[45] Date of Patent: Mar. 19, 1985

[54] MULTI-AXLE VEHICLE

[75] Inventors: John Hobbs, Rockford, Ill.; Wolfgang Schrader, Beilstein, Fed. Rep. of Germany

[73] Assignee: Robert Bosch GmbH, Stuttgart, Fed. Rep. of Germany

[21] Appl. No.: 424,967

[22] Filed: Sep. 27, 1982

[30] Foreign Application Priority Data

Mar. 8, 1982 [DE] Fed. Rep. of Germany ....... 3208315

[51] Int. Cl.³ .................... G01G 19/08; G01G 3/14; B62D 53/00
[52] U.S. Cl. ........................... 177/136; 177/210 EM; 280/407
[58] Field of Search ................ 177/136, 210 EM; 73/862.69; 280/407, 438 R

[56] References Cited

U.S. PATENT DOCUMENTS

| 3,170,716 | 2/1965 | Walther et al. | 280/407 |
| 3,439,935 | 4/1969 | Guidice | 280/407 |
| 4,070,033 | 1/1978 | Weir et al. | 280/407 X |
| 4,328,494 | 5/1982 | Goodall | 177/136 X |
| 4,427,075 | 1/1984 | Romes | 73/862.69 |
| 4,429,892 | 2/1984 | Frampton et al. | 280/407 |

Primary Examiner—George H. Miller, Jr.
Attorney, Agent, or Firm—Michael J. Striker

[57] ABSTRACT

A multi-axle load vehicle has a tractor, a device supporting a load on the tractor and including an axially displaceable holder arranged on the tractor, a supporting plate arranged to support a load, and at least one pin supporting the supporting plate on the holder, and a device for determining a load acting upon the vehicle and including a sensor arranged in the pin composed of a magnetic material and operative for measuring a load and generating an electric signal corresponding thereto, and an indicating element arranged in a driver's cabin and operative for receiving the electrical signal and indicating the load.

13 Claims, 8 Drawing Figures

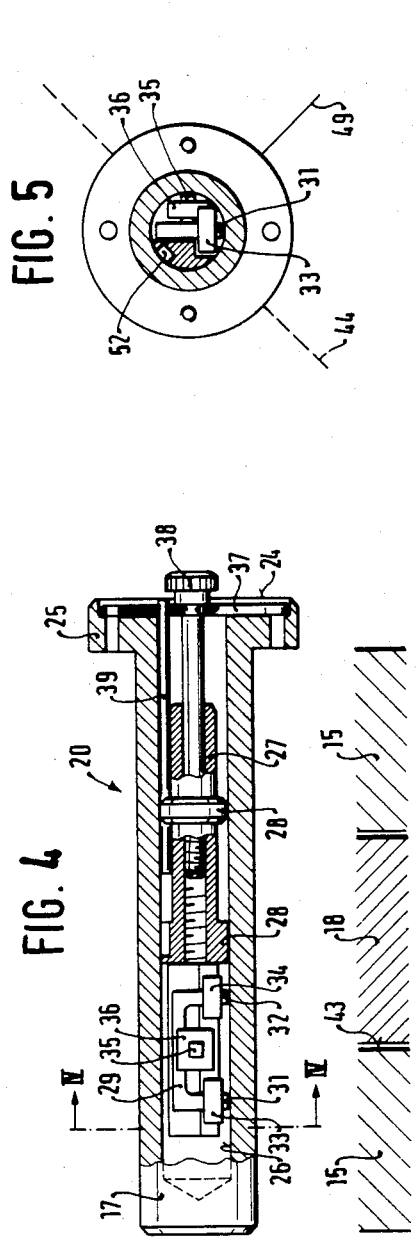
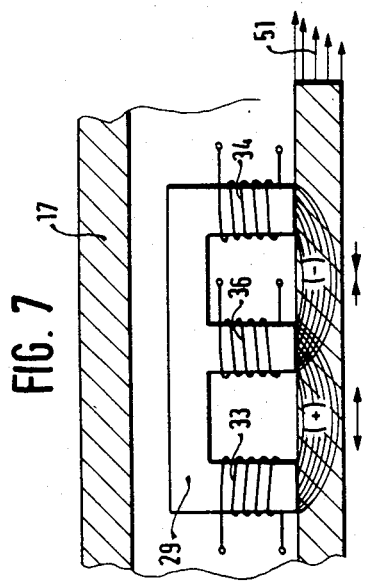
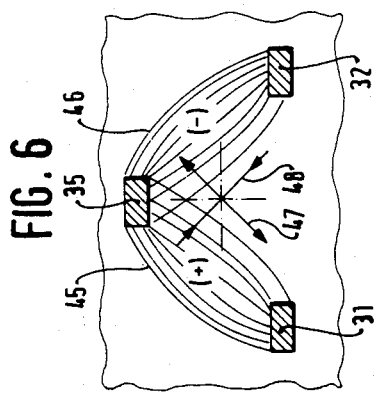

MULTI-AXLE VEHICLE

BACKGROUND OF THE INVENTION

The present invention relates to a load vehicle. More particularly, it relates to a multi-axle load vehicle having a tractor.

In a known load vehicle the driver always sees on the indicating device how high is the vehicle loaded and he can distribute the load so that the individual axles, particularly the steering axle, are loaded properly. Thereby an overloading of the vehicle can be avoided, and also an excessively low loading can be prevented from which the effectiveness can suffer. The known load vehicles have, however, the disadvantage that the distribution of the load during loading is very complicated, as disclosed, for example, in "Truck and Off-Highway Industries", July 1981.

SUMMARY OF THE INVENTION

Accordingly, it is an object of the present invention to provide a multi-axle load machine which avoids the disadvantages of the prior art.

More particularly, it is an object of the present invention to provide a load vehicle with a tractor in which the distribution of load is considerably simpler than in the known load vehicles.

It is also an object of the present invention to provide a multi-axle load vehicle in which the load can be distributed in a simple manner from a driver's cabin properly.

Still another object of the present invention is to provide a small multi-axle load vehicle in which the steering axle is not overloaded, which is particularly important inasmuch as the steering of the vehicle can otherwise be strongly affected.

The automatic weighing and load distributing system economizes thereby on the driving of weighing stations or load distribution required there.

In keeping with these objects and with others which will become apparent hereinafter, one feature of the present invention resides, briefly stated, in a multi-axle load vehicle which has a tractor, means supporting a load on the tractor and including an axially displaceable holder arranged on the tractor, a supporting plate arranged to support a load, and at least one pin supporting the supporting plate on the holder, and means for determining a load acting upon the vehicle, wherein the pin is composed of a magnetic material, and the determining means includes a sensor arranged in the pin of a magnetic material and operative for measuring a load and generating an electric signal corresponding thereto, and an indicating element arranged in a driver's cabin and operative for receiving the electric signal and indicating the load.

When the multi-axle load vehicle is designed in accordance with the present invention, it attains the above-mentioned objects.

In accordance with another advantageous feature of the present invention, the position of the supporting plate is adjustable from the driver's cabin by controlling a servomotor actuating the holder.

Still another feature of the present invention is that there is a counter arranged to receive values of an entire weight of the vehicle and the distance from a longitudinal axis to the pin, and counting from these values a position of the supporting plate for favorable loading of the vehicle's steering axle and controlling this position.

A further feature of the present invention is that the sensor has a magnetic core provided with several coils arranged in an inner space of the hollow pin.

The sensor of the determining means may be arranged axially adjustable in the inner space of the hollow pin and also adjustable in an angular direction.

Finally, still a further feature of the present invention is that a core supporting member supports the magnetic core with the coils of the sensor and is inserted in a blind hole of the pin.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a view showing a longitudinal section of a sensor of the inventive load vehicle;

FIG. 5 is a view of the inventive sensor taken along the line IV—IV in FIG. 4; and FIGS. 6–8 are views schematically showing some parts of the inventive load vehicle.

DESCRIPTION OF A PREFERRED EMBODIMENT

Figure 1:
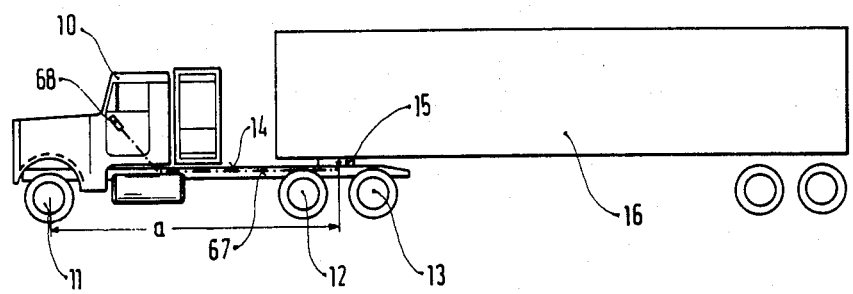
FIG. 1 is a view showing a multi-axle vehicle with a tractor and a load coupled thereto, in accordance with the present invention.
Figure 2:
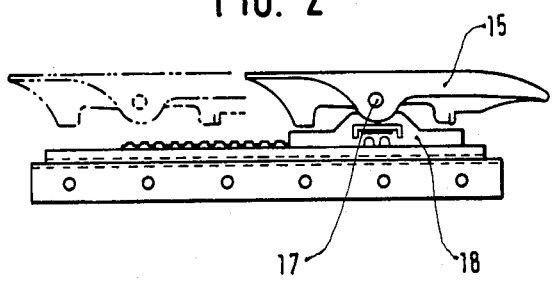
FIGS. 2 and 3 are side and plan views of a coupling device on the tractor in accordance with the present invention.
Figure 3:
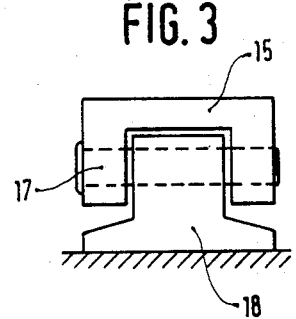

A load vehicle in accordance with the invention has a tractor or a pulling vehicle identified by reference numeral 10 and having a steering axle 11 and two loading axles 12 and 13. A supporting plate 15 is located on a chassis 14 above the loading axles 12 and 13. A trailer container 16 is mounted on the supporting plate 15.

For properly distributing the load of the container 16 acting upon the tractor between three axles, the supporting plate 15 is arranged displaceable on the chassis 14. For this purpose it is supported pivotally via one or more pins 17, in dependence upon the particular construction, on a holder 18. The holder 18 can travel along the chassis with the aid of the not-shown electric or hydraulic servomotor.

A computer 68 with an indicator board is located in a driver's cabin. It continuously receives information about the loading of the tractor by the load 16 and indicates the same. This information in form of electric signals is obtained in the computer via a magneto-electric sensor 20 or transformer transmitter arranged in the pin 17, as shown in FIGS. 4–7. The pin 17 has at its one end side 24 a flange 25 from which a blind hole 26 extends into the pin 17. A spool carrier 27 is inserted in the blind hole 26 and guided in it by two piston portions 28.

At the spool carrier end extending into the blind hole 26, an E-shaped magnetic core 29 is mounted. As can be seen from FIG. 4, the magnetic core 29 is located in a separating plane between the parts 15 and 18, or in other words in a region where the tangential stress in the pin 17 because of the load acting upon the plate 15 is maximum. The magnetic core 29 has two outer legs 31 and 32 lying in the same plane and carrying two secondary spools 33 and 34. A central leg 35 of the E-shaped magnetic core 29 is bent to the outer legs by 90° and carries a primary spool 36. The magnetic core 29 is arranged so that the end of the legs 31, 32 and 35 are located as close as possible to the inner wall of the blind hole 26.

The blind hole 26 is closed at its one end side 24 by a cover disk 37. An adjusting screw 38 is arranged in the cover disk 37 and extends with its free end into the spool carrier 27 so as to adjust the spool carrier 27 in its axial position. For imparting to the spool carrier 27 a predetermined angular position in the pin 17, a guide rod 39 is mounted in the cover disk 37 and extends through a recess in the piston portion 28 of the spool carrier 27.

The electric contacts for the primary spool 36 and the secondary spools 33 and 34 extend outwardly through the spool carrier 37 in a not-shown manner. Such a pin is known from the German Offenlegungsschrift No. 3,004,592.

As can be seen from FIG. 5, the force acting upon the pin 17 engages it in direction of the line 44. Thereby it is attained that the magnetic flux lines run via the pins 17 in a region of high tangential stress. The pins 17 are composed of a magnetic, particularly soft magnetic material, whereby the above-mentioned field line flux can take place.

The sensor or the magneto-electric transmitter 20 utilizes the effect that it changes the magnetic properties of the certain material when it is subjected to a mechanical stress. The spool carrier 27 with the magnetic core 29 lies advantageously in a region in which the maximum tangential stresses act in the pin 17 because of the force acting on the supporting plate.

A constant stress takes place on the primary spool 36. A measuring stress takes place on both outer secondary spools 33 and 34. The secondary spools 33 and 34 are designed so that the transmitter operates in accordance with a differential method.

As can be seen from FIGS. 6 and 7, magnetic flux lines 45 are formed between the legs 31 and 35 in the pin 17, and magnetic flux lines 46 are formed between the legs 32 and 35 in the pin 17. In the region of these magnetic flux lines 45 and 46, in the material of the pin 17 because of the carrying tangential stresses, a pulling stress 47 acts between the legs 31 and 35 and a pressing stress 48 acts between the legs 32 and 35. When the force direction changes, the pulling and pressing stresses exchange thereby the direction of the electric signal is also changed. Because of the magneto-elasticity of the material, the permeability of the pin 17 in the region of the pulling stress 47 is increased, and the permeability of the pin 17 in the region of the pressing stress 48 decreases. As a result of this, a coupling change between the primary spool 36 and the secondary spools 33 and 34 takes place, whereby a measuring stress proportional to the acting pressing force can be obtained.

With the aid of a guide rod 39 and the cover disk 37 it is provided that the magnetic core 29 is always retained in such a position in which a median 49 between the central leg 35 and the outer leg 31 extends substantially normal to a line 44, as can be seen from FIG. 5. It is thereby attained that the magnetic flux lines 45 and 46 run in the region of the pin 17 in which the tangential stress is maximum. By the arrangement of the magnetic core 29 with its spools in the interior of the pin 17 a high signal efficiency is obtained, inasmuch as a tangential stress 51 in a tubular wall increases from outside inwardly, as shown in FIG. 7. The constant voltage supply of the primary spool 35 is provided for example via the battery of the vehicle.

Figure 8:
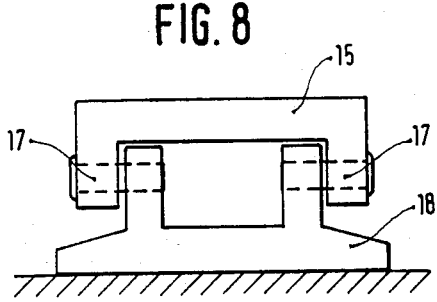

The values produced from the sensor 20 are supplied via a conductor 67 to the computer 68 in the driver's cabin. It is also supplied with the weight of the tractor 10, the weight of the container 16, the distance a from the steering axle to the pin 17, the permissible loading for the steering axle 11 and the axles 12 and 13. The program contained in the computer 68 counts now the distance a which must always be located between the axles 12 and 13. As mentioned above, the holder 18 is controlled and displaced by a servomotor from the computer 68. It is to be understood that the present invention can also deal with such a vehicle in which the tractor has only one axle, for example the axle 13. In this case the trailer lies naturally between this axle and the steering axle 12. The holder 18 or the plate 15 can also be designed so that a pin 17 can be inserted from both sides of each of them, and both pins or only one of them receives an electric measuring device in its interior, as can be seen in FIG. 8.

It will be understood that each of the elements described above, or two or more together, may also find a useful application in other types of constructions differing from the types described above.

While the invention has been illustrated and described as embodied in a multi-axle load vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the present invention.

What is claimed as new and desired to be protected by Letters Patent is set forth in the appended claims.

What is claimed is:

1. In a multi-axle load vehicle including a tractor having a driver's cabin, a sensor for sensing a load acting on the vehicle and producing an electrical signal corresponding to said load, and an indicator device positioned in said cabin of the vehicle and operative for receiving said signal and supplying a driver with the information about said load, the improvement comprising that
    (a) said tractor includes a supporting plate and a holder axially displaceable on said tractor, said holder being attached in such a manner that a pin horizontally extends through holes in said holder and said supporting plate so that said pin holds said holder in overlapping relationship with said pin,
    (b) said sensor is accommodated in said pin, said pin being formed of magnetic material; and
    (c) said sensor is a magnetoelastic pickup.

2. A multi-axle load vehicle as defined in claim 1, wherein said supporting plate is pivotally mounted about said pin.

3. A multi-axle load vehicle as defined in claim 1, wherein said pickup includes a magnetic core havng a central leg and two outer legs, and a primary coil arranged on said central leg and two secondary coils each arranged on a respective one of said outer legs.

4. A multi-axle load vehicle as defined in claim 1, and further comprising means for adjusting a position of said supporting plate from a driver's cabin and including a motor controllable from the driver's cabin and acting upon said holder.

5. A multi-axle load vehicle as defined in claim 4; wherein the vehicle has a steering axle; and further comprising a computer connected to said indicator device and arranged to receive values of an entire load of the vehicle and a distance from said axle to said pin, and determining from said values a position of said supporting plate for favorable loading of said steering axle and controlling said position.

6. A multi-axle load vehicle as defined in claim 5, wherein said pin is hollow and has an inner hollow space, said pickup having a magnetic core provided with several coils and arranged in said inner space of said hollow pin.

7. A multi-axle load vehicle as defined in claim 6, wherein said magnetic core of said pickup is arranged axially adjustable in said inner space of said hollow pin.

8. A multi-axle load vehicle as defined in claim 6, wherein said magnetic core of said pickup is arranged adjustable in its angular position in said inner space of said hollow pin.

9. A multi-axle load vehicle as defined in claim 6, wherein said pin has a blind hole forming an inner hollow space, said pickup including a magnetic core provided with a plurality of coils and a coil supporting member arranged to support said magnetic core with said coils and inserted in said inner blind hole of said pin.

10. A multi-axle load vehicle as defined in claim 6, wherein said pickup is formed as a transformer transmitter.

11. A multi-axle load vehicle as defined in claim 10, wherein said pickup has a magnetic core with two legs and a primary spool and at least one secondary spool supported on said legs, said legs of said magnetic core forming a right angle therebetween with a median extending at least substantially normal to a force-acting direction.

12. A multi-axle load vehicle as defined in claim 10, wherein said pickup has a magnetic core with two legs with two secondary coils arranged thereon operating in accordance with a differential measuring method.

13. A multi-axle load vehicle as defined in claim 10, wherein said pin has an end side, said pickup having electric contacts extending on said end side of said pin.

* * * * *